(12) United States Patent
Weng et al.

(10) Patent No.: US 10,148,196 B2
(45) Date of Patent: Dec. 4, 2018

(54) INVERTER AND CONTROL METHOD THEREOF

(71) Applicant: Delta Electronics (Shanghai) CO., LTD, Shanghai (CN)

(72) Inventors: Bingwen Weng, Shanghai (CN); Jianming Chen, Shanghai (CN); Xuancai Zhu, Shanghai (CN); Jinfa Zhang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 15/486,467

(22) Filed: Apr. 13, 2017

(65) Prior Publication Data
US 2017/0302196 A1    Oct. 19, 2017

(30) Foreign Application Priority Data

Apr. 19, 2016   (CN) .......................... 2016 1 0243872

(51) Int. Cl.
*H02M 7/5387*   (2007.01)
*H02M 1/08*   (2006.01)
(Continued)

(52) U.S. Cl.
CPC ......... *H02M 7/53871* (2013.01); *H02M 1/08* (2013.01); *H02M 1/32* (2013.01);
(Continued)

(58) Field of Classification Search
CPC ............ H02M 7/00; H02M 7/42; H02M 7/44; H02M 7/48; H02M 7/53; H02M 7/537; H02M 7/5387; H02M 7/53871; H02M 7/53873; H02M 7/53875; H02M 7/5388; H02M 7/539; H02M 7/5395; H02M 7/483; H02M 7/487; H02M 1/08; H02M 1/088;
(Continued)

(56) References Cited

U.S. PATENT DOCUMENTS

2009/0135636 A1* 5/2009 Kuzumaki ............ H02M 1/096
363/132
2011/0122667 A1* 5/2011 Mino ................... H02M 1/4208
363/125

(Continued)

*Primary Examiner* — Timothy J Dole
*Assistant Examiner* — Carlos Rivera-Perez
(74) *Attorney, Agent, or Firm* — Yunling Ren

(57) ABSTRACT

An inverter includes a first bridge leg, first to fourth MOSFET switches; a second bridge leg, connected in parallel with the first bridge leg, and fifth to eighth MOSFET switches; a third bridge leg, electrically coupled between a first node and a second node, and ninth to twelfth MOSFET switches; a first diode, connected in parallel with the anti-series connected first and second MOSFET switches; a second diode, connected in parallel with the anti-series connected third and fourth MOSFET switches; a third diode, connected in parallel with the anti-series connected fifth and sixth MOSFET switches; a fourth diode, connected in parallel with the anti-series connected seventh and eighth MOSFET switches; a fifth diode, connected in parallel with the anti-series connected ninth and tenth MOSFET switches; a sixth diode, connected in parallel with the anti-series connected eleventh and twelfth MOSFET switches.

15 Claims, 26 Drawing Sheets

(51) Int. Cl.
*H02M 1/32* (2007.01)
*H02M 1/44* (2007.01)
*H02M 1/00* (2006.01)
*H02M 1/088* (2006.01)

(52) U.S. Cl.
CPC .......... H02M 7/5387 (2013.01); *H02M 1/088* (2013.01); *H02M 1/44* (2013.01); *H02M 2001/0048* (2013.01)

(58) Field of Classification Search
CPC .......... H02M 1/32; H02M 1/44; H02M 1/083; H02M 1/096; H02M 3/22; H02M 3/28; H02M 3/325; H02M 3/335; H02M 3/33507; H02M 2001/0048; H02M 2001/0051; H02M 2001/0054; H02M 2001/0058; H02M 2001/0064; H02M 2007/4807; H02M 2007/4811; H02M 2007/4822; H02M 2007/53878
USPC .......... 363/15–21.03, 37, 40–43, 71, 95–99, 363/131–139; 323/271–275, 282–285, 323/351, 906
See application file for complete search history.

(56) References Cited

U.S. PATENT DOCUMENTS

| | | | |
|---|---|---|---|
| 2013/0114321 A1* | 5/2013 | Zhang | H02M 7/44 363/132 |
| 2014/0301123 A1* | 10/2014 | Lee | H02M 7/5387 363/132 |

* cited by examiner

US 10,148,196 B2

INVERTER AND CONTROL METHOD THEREOF

CROSS REFERENCE

This application is based upon and claims priority to Chinese Patent Application No. 201610243872.X, filed on Apr. 19, 2016, the entire contents thereof are incorporated herein into reference.

TECHNICAL FIELD

The present disclosure is related to the field of power electronic technology, and more particularly, to the inverter and control method thereof.

BACKGROUND

With increasing tension of traditional energy and increasing deterioration of global climate issues, human being's demand for renewable energy becomes increasingly urgent. Solar power, as a clean energy, obtains widespread focuses and obtains application all sectors of society, due to its unique advantages such as inexhaustibility, no pollution and so on. Currently, people pay increasingly concern on distributed generation technologies which are used for the renewable energy.

A DC/AC inverter is a core device of the renewable energy supply. The inverter converts DC power (e.g., power of photovoltaic array) into AC power, and includes an inverter bridge, control circuit and filter circuit. In photovoltaic industry, a solar power inverter mainly functions in converting DC power output by a photovoltaic array to AC power. The DC power which flows through a full bridge circuit, is filtered, boosted, and is generally modulated by a sinusoidal pulse width modulation (SPWM) processor to obtain sinusoidal AC power that matches with load/power grid frequency and rated voltage for users of the system.

As penetration of solar power is getting higher and higher, the reactive power output capability is now request by most of the grid to support grid operation and stability.

Therefore, it is necessary to provide a new inverter and a control method thereof.

The above information disclosed in this Background section is only for enhancing understanding of the background of the present disclosure, therefore, it may include information that is not constitute of prior art known by those skilled in the art.

SUMMARY

The present disclosure provides an inverter and a control method thereof.

Other features and advantages of the present disclosure will become apparent from the following description, or may be partly learned by the practice of the present disclosure.

According to an aspect of the present disclosure, there is provided an inverter, including: a first bridge leg, electrically coupled to a first input node of the inverter and a second input node of the inverter, and including a first MOSFET switch, a second MOSFET switch, a third MOSFET switch and a fourth MOSFET switch in sequence, a connection point between the second MOSFET switch and the third MOSFET switch being served as a first node; a second bridge leg, connected in parallel with the first bridge leg, and including a fifth MOSFET switch, a sixth MOSFET switch, a seventh MOSFET switch and an eighth MOSFET switch in sequence, a connection point between the sixth MOSFET switch and the seventh MOSFET switch being served as a second node; a third bridge leg, electrically coupled between the first node and the second node, and including a ninth MOSFET switch, a tenth MOSFET switch, an eleventh MOSFET switch and a twelfth MOSFET switch in sequence; a first diode, connected in parallel with the first MOSFET switch and the second MOSFET switch, wherein the first MOSFET switch and the second MOSFET switch are in anti-series connection; a second diode, connected in parallel with the third MOSFET switch and the fourth MOSFET switch, wherein the third MOSFET switch and the fourth MOSFET switch are in anti-series connection; a third diode, connected in parallel with the fifth MOSFET switch and the sixth MOSFET switch, wherein the fifth MOSFET switch and the sixth MOSFET switch are in anti-series connection; a fourth diode, connected in parallel with the seventh MOSFET switch and the eighth MOSFET switch, wherein the seventh MOSFET switch and the eighth MOSFET switch are in anti-series connection; a fifth diode, connected in parallel with the ninth MOSFET switch and the tenth MOSFET switch, wherein the ninth MOSFET switch and the tenth MOSFET switch are in anti-series connection; a sixth diode, connected in parallel with the eleventh MOSFET switch and the twelfth MOSFET switch, wherein the eleventh MOSFET switch and the twelfth MOSFET switch are in anti-series connection, and are in anti-series connection with the fifth diode; a first inductor, electrically coupled between the first node and a first output end of the inverter; and a second inductor, electrically coupled between the second node and a second output end of the inverter.

According to another aspect of the present disclosure, there is provided a control method for controlling an inverter, including: turning on and off the first MOSFET switch, the second MOSFET switch, the seventh MOSFET switch and the eighth MOSFET switch synchronously, and controlling on and off of the ninth MOSFET switch and the tenth MOSFET switch to be complementary with on and off of the first MOSFET switch, the second MOSFET switch, the seventh MOSFET switch and the eighth MOSFET switch; and turning on and off the third MOSFET switch, the fourth MOSFET switch, the fifth MOSFET switch and the sixth MOSFET switch synchronously, and controlling on and off of the eleventh MOSFET switch and the twelfth MOSFET switch to be complementary with on and off of the third MOSFET switch, the fourth MOSFET switch, the fifth MOSFET switch and the sixth MOSFET switch.

BRIEF DESCRIPTION OF THE DRAWINGS

The accompanying drawings, which are incorporated into and constitute a part of this specification, illustrate embodiments that are consistent with the disclosure together with the description, and are served to explain the principles of the disclosure.

DETAILED DESCRIPTION

Figure 1:
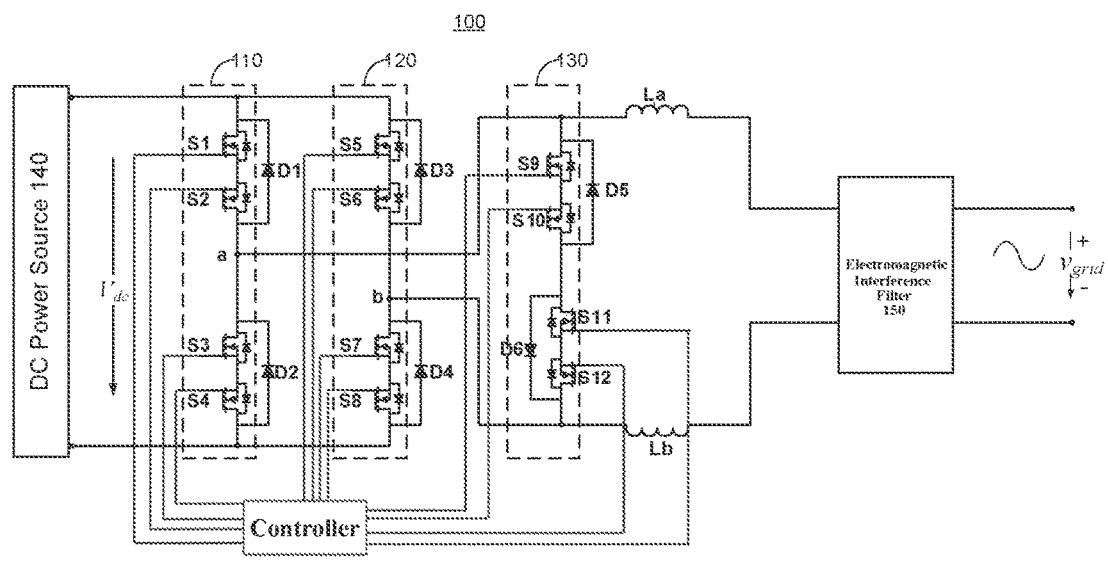
FIG. 1 schematically illustrates a circuit diagram of an inverter according to an exemplary implementation of the present disclosure.

The exemplary implementations will now be described more fully with reference to the accompanying drawings. However, the exemplary implementations may be implemented in various forms and should not be understood as being limited to the implementations set forth herein; on the contrary, these implementations are provided so that this disclosure will be thorough and complete, and the conception of exemplary implementations will be fully conveyed to those who are skilled in the art. The accompanying drawings are only schematic illustration of the present disclosure, and not drawn to scale. In the drawings, the same reference numerals denote the same or similar structures, thus their detailed description will be omitted.

In addition, the features, structures or characteristics described herein can be combined in one or more embodiments in any appropriate way. In the description herein, many specific details are provided for fully understanding of the embodiments of the present disclosure. However, it will be appreciated by those who are skilled in the art that the technical solution of the present disclosure can be practiced without one or more of the specific details, or other methods, components, devices or steps, etc. In addition, known structures, methods, devices, implementations, materials or operations will not be illustrated or described in detail, in order to avoid obscuration of the aspects of the present disclosure.

The implementations described in the following exemplary embodiments do not represent all implementations that are consistent with the present disclosure. Instead, they are merely examples of devices and methods that are consistent with aspects related to the disclosure as recited in the appended claims.

In the present specification, description involved with "coupling" may refer to that a component is indirectly connected to another component via other components, or that a component is directly connected to another component.

In the present specification, unless specifically defined herein, otherwise, articles such as "a" or "the" may refer to one or more in general.

Herein, an MOSFET refers to a Metal-Oxide-Semiconductor Field-Effect Transistor. The MOSFET includes therein a body diode by itself.

FIG. 1 schematically illustrates a circuit diagram of an inverter 100 according to an exemplary implementation of the present disclosure.

As shown in FIG. 1, the inverter 100 includes a first bridge leg 110, a second bridge leg 120 and a third bridge leg 130.

The first bridge leg 110 is electrically coupled to a first input node of the inverter and a second input node of the inverter, wherein the first input node and the second input node may be coupled to a DC source 140. The first bridge leg 110 includes a first MOSFET switch S1, a second MOSFET switch S2, a third MOSFET switch S3 and a fourth MOSFET switch S4 connected in series and arranged in sequence, wherein a connection point between the second MOSFET switch S2 and the third MOSFET switch S3 is served as a first node "a". The second bridge leg 120 is connected in parallel with the first bridge leg 110, and includes a fifth MOSFET switch S5, a sixth MOSFET switch S6, a seventh MOSFET switch S7 and an eighth MOSFET switch S8 connected in series and arranged in sequence, wherein a connection point between the sixth MOSFET switch S6 and the seventh MOSFET switch S7 is served as a second node "b". The third bridge 130 is electrically coupled between the first node "a" and the second node "b", and includes a ninth MOSFET switch S9, a tenth MOSFET switch S10, an eleventh MOSFET switch S11 and a twelfth MOSFET switch S12 connected in series and arranged in sequence. In the present embodiment, the first MOSFET switch S1 and the second MOSFET switch S2 are connected in anti-series, the third MOSFET switch S3 and the fourth MOSFET switch S4 are in anti-series connection, the fifth MOSFET switch S5 and the sixth MOSFET switch S6 are in anti-series connection, the seventh MOSFET switch S7 and the eighth MOSFET switch S8 are in anti-series connection, the ninth MOSFET switch S9 and the tenth MOSFET switch S10 are in anti-series connection, and the eleventh MOSFET switch S11 and the twelfth MOSFET switch S12 are in anti-series connection. Taking the first MOSFET switch S1 and the second MOSFET switch S2 being in anti-series connection for example, a source electrode of the first MOSFET switch S1 of the first bridge leg 110 is connected with a source electrode of the second MOSFET switch S2. However, the present disclosure is not limited to this. For example, a drain electrode of the first MOSFET switch S1 of the first bridge leg 110 is connected with a drain electrode of the second MOSFET switch S2 to form anti-series connection.

The inverter further includes a first diode D1, a second diode D2, a third diode D3, a fourth diode D4, a fifth diode D5 and a sixth diode D6. The first diode D1 is connected in parallel with the first MOSFET switch S1 and the second MOSFET switch S2 which are in anti-series connection. The second diode D2 is connected in parallel with the third MOSFET switch S3 and the fourth MOSFET switch S4 which are in anti-series connection. The third diode D3 is connected in parallel with the fifth MOSFET switch S5 and the sixth MOSFET switch S6 which are in anti-series connection. The fourth diode 174 is connected in parallel with the seventh MOSFET switch S7 and the eighth MOSFET switch S8 which are in anti-series connection. The fifth diode D5 is connected in parallel with the ninth MOSFET switch S9 and the tenth MOSFET switch S10 which are in anti-series connection. The sixth diode D6 is connected in parallel with the eleventh MOSFET switch S11 and the twelfth MOSFET switch S12 which are in anti-series connection. The fifth diode D5 and the sixth diode D6 are in anti-series connection.

In an exemplary embodiment, the first MOSFET switch S1 to the twelfth MOSFET switch S12 may be N-channel enhanced MOSFETs. The first diode D1 to the sixth diode D6 may be fast recovery diodes or silicon carbide diodes with good reverse recovery characteristic. However, the present disclosure is not limited to type selections of devices.

The inverter 100 further includes a first inductor La, electrically coupled between the first node "a" and a first output end of the inverter 100; and a second inductor Lb, electrically coupled between the second node "b" and a second output end of the inverter 100. Inductance values of the first inductor La and the second inductor Lb may be the same.

In an exemplary embodiment, the inverter 100 further includes a controller which is configured to generate a control signal to control on and off of the first MOSFET switch S1 to the twelfth MOSFET switch S12. For example, a pulse width modulation unit of the controller is employed to generate a first control signal G1, a second control signal G2, a third control signal G3, a fourth control signal G4, a fifth control signal G5, a sixth control signal G6, a seventh control signal G7, an eighth control signal G8, a ninth control signal G9, a tenth control signal G10, a eleventh control signal G11 and a twelfth control signal G12, which are respectively input to control terminals of the first MOSFET switch S1, the second MOSFET switch S2, the third MOSFET switch S3, the fourth MOSFET switch S4, the fifth MOSFET switch S5, the sixth MOSFET switch S6, the seventh MOSFET switch S7, the eighth MOSFET switch S8, the ninth MOSFET switch S9, the tenth MOSFET switch S10, the eleventh MOSFET switch S11 and the twelfth MOSFET switch S12, wherein the control terminal may be a gate electrode of a corresponding MOSFET.

In an exemplary embodiment, the first MOSFET switch S1, the third MOSFET switch S3, the fifth MOSFET switch S5, the seventh MOSFET switch S7, the ninth MOSFET switch S9 and the twelfth MOSFET switch S12 may be high voltage MOSFETs. The second MOSFET switch S2, the fourth MOSFET switch S4, the sixth MOSFET switch S6, the eighth MOSFET switch S8, the tenth MOSFET switch S10 and the eleventh MOSFET switch S11 may be low voltage MOSFETs. For example, the high voltage MOSFET may be a MOSFET which withstands voltages of 600V-650V, and the low voltage MOSFET may be a MOSFET which withstands voltages of 30V-100V.

In an exemplary embodiment, the inverter 100 may be configured to perform:

turning on and off the first MOSFET switch, the second MOSFET switch, the seventh MOSFET switch and the eighth MOSFET switch synchronously, and controlling on and off of the ninth MOSFET switch and the tenth MOSFET switch to be complementary with on and off of the first MOSFET switch, the second MOSFET switch, the seventh MOSFET switch and the eighth MOSFET switch;

turning on and off the third MOSFET switch, the fourth MOSFET switch, the fifth MOSFET switch and the sixth MOSFET switch synchronously, and controlling turning on and off of the eleventh MOSFET switch and the twelfth MOSFET switch to be complementary with on and off of the third MOSFET switch, the fourth MOSFET switch, the fifth MOSFET switch and the sixth MOSFET switch:

when the first MOSFET switch, the second MOSFET switch, the seventh MOSFET switch and the eighth MOSFET switch are controlled to be turned on, turning on the first MOSFET switch and the seventh MOSFET switch earlier than the second MOSFET switch and the eighth MOSFET switch, and when the first MOSFET switch, the second MOSFET switch, the seventh MOSFET switch and the eighth MOSFET switch are controlled to be turned off, turning off the first MOSFET switch and the seventh MOSFET switch later than the second MOSFET switch and the eighth MOSFET switch; and when the third MOSFET switch, the fourth MOSFET switch, the fifth MOSFET switch and the sixth MOSFET switch are controlled to be turned on, turning on the third MOSFET switch and the fifth MOSFET switch earlier than the fourth MOSFET switch and the sixth MOSFET switch, and when the third MOSFET switch, the fourth MOSFET switch, the fifth MOSFET switch and the sixth MOSFET switch are controlled to be turned off, turning off the third MOSFET switch and the fifth MOSFET switch later than the fourth MOSFET switch and the sixth MOSFET switch.

Generally, the body diode of a high voltage MOSFET may have poor reverse recovery characteristics, which may be easily damaged in the case where a current flows therethrough. On the contrary, the body diode of a low voltage MOSFET may be well designed to be capable of carrying current.

Accordingly, in one embodiment, with the circuit structure of the inverter and the method for controlling the same, it is possible to prevent current from flowing through the body diode of the high voltage MOSFETs and enable natural soft switching of all the low voltage MOSFETs, thereby better protecting the high voltage MOSFETs in a high voltage application, and increasing stability of the devices using the circuit structure.

In an exemplary embodiment, the inverter 100 may further include an electromagnetic interference filter 150 which is electrically coupled between the first and second inductors La and Lb and the first and second output ends of the inverter. The electromagnetic interference filter 150 which may effectively control electromagnetic interference signals generated by the inverter 100 itself, prevents the signals from entering into a power grid, polluting electromagnetic environmental or damaging other equipment.

In an exemplary embodiment, the first input node of the inverter 100 and the second input node of the inverter 100 are electrically coupled to a photovoltaic array.

In an exemplary embodiment, the inverter 100 may further include a DC source 140, wherein two ends thereof are respectively electrically coupled to the first input node and the second input node of the inverter 100.

FIG. 1 is a schematic diagram in which the above inverter is applied to the photovoltaic power grid generation. DC sides of the above inverter are coupled with photovoltaic array, AC side thereof is coupled to the power grid via an inductor. But in practical applications, the inverter of the present disclosure may also be applied to occasions where AC sides are connected with a load, i.e., output ends of the inverter are connected with the load. The electromagnetic interference filter 150 may be omitted from the circuit at this time. However, the present disclosure is not limited to this. Those who are skilled in the art may apply the inverter to any field according to actual needs.

Figure 2:
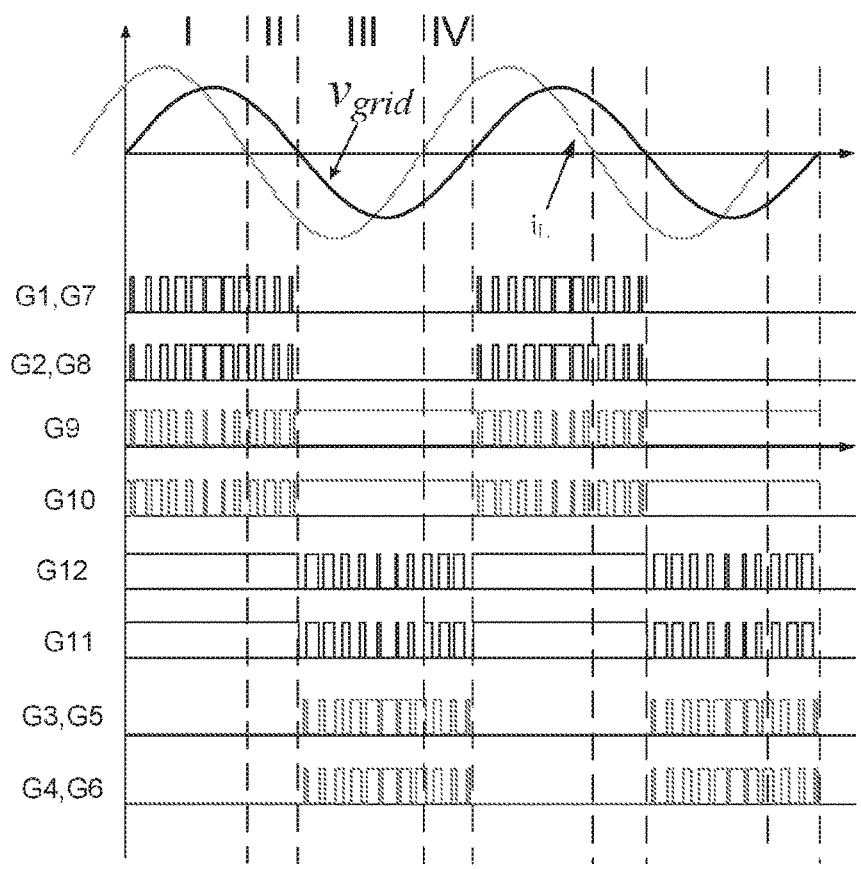
FIG. 2 is a waveform graph of voltage and current of the inverter of FIG. 1.

FIG. 2 is a relationship diagram based on power grid voltage $V_{grid}$ of the inverter (voltage at output ends of the inverter), inductor current $i_L$ and switching timing. The denoted four sections I, II, III and IV are respectively used for indicating areas where the inverter output active/reactive power.

In operation, DC source 140 provides DC voltage Vdc. The inverter may be controlled based on control timing as shown in FIG. 2. In one embodiment, pulses of the first control signal G1 and the second control signal G2 may be consistent, i.e., the first control signal G1 and the second control signal G2 are synchronizing signal, so that the first MOSFET switch and the second MOSFET switch corresponding to the first control signal G1 and the second control signal G2 may be turned on and off synchronously. In the present disclosure, it should be noted that switches are controlled to be turned on and off synchronously does not mean that the switches must be turning on and off at the exactly same time point. Instead, it may mean that if one switch is turned on/off during a certain period of time, other switches will also be turned on/off during the same period of time. Further, the situation when the switches are controlled to be turning on and off at the time points that are a little bit different from each other to enable natural soft switching could still be in the range of the conception of "be turned on and off synchronously". For example, in one embodiment, pulses of the first control signal G1 and the second control signal G2 may be substantially consistent, where the first MOSFET switch is turned on earlier than the second MOSFET switch and turned off later than the second MOSFET switch, to enable natural soft switching of the second MOSFET switch. Control signals of other switches such as pulses of the third control signal G3 and the fourth control signal G4, pulses of the fifth control signal G5 and the sixth control signal G6, pulses of the seventh control signal G7 and the eighth control signal G8, pulses of the ninth control signal G9 and the tenth control signal G10, and pulses of the eleventh control signal G11 and the twelfth control signal G12, may be provided similarly.

In an exemplary embodiment, the first control signal G1, the second control signal G2, the seventh control signal G7 and the eighth control signal G8 may be one group of synchronizing signals (a first group of synchronizing signals), and the ninth control signal G9 and the tenth control signal G10 may be one group of synchronizing signals (a second group of synchronizing signals). The two groups the first and second groups) of synchronizing signals are complementary with each other, so that turning on and off the corresponding two groups of MOSFETs are complementary. The third control signal G3, the fourth control signal G4, the fifth control signal G5 and the sixth control signal G6 may be one group of synchronizing signals (a third group of synchronizing signals), and the eleventh control signal G11 and the twelfth control signal G12 may be one group of synchronizing signals (a fourth group of synchronizing signals). The two groups (i.e., the third and fourth groups) of synchronizing signals are complementary with each other, so that turning on and off the corresponding two groups of MOSFETs are complementary.

Referring to FIG. 2, during a half cycle when output voltage of the inverter is positive, the eleventh MOSFET switch and the twelfth MOSFET switch are kept on. The first group including the first MOSFET switch, the second MOSFET switch, the seventh MOSFET switch and the eighth MOSFET switch may be controlled to be alternately on and off while the first group is complementary with the second group including the ninth MOSFET switch and the tenth MOSFET switch.

During a half cycle when output voltage of the inverter is negative, the ninth MOSFET switch and the tenth MOSFET switch are kept on. The third group including the third MOSFET switch, the fourth MOSFET switch, the fifth MOSFET switch and the sixth MOSFET switch may be controlled to be alternately on and off while the third group is complementary with the fourth group including the eleventh MOSFET switch and the twelfth MOSFET switch. Since the inverter outputs AC, the above positive or negative output voltage of the inverter is merely used for distinguishing from each half cycle before or after a zero crossing point of the voltage. The present disclosure is not limited to this.

When the controller gives different on/off combinations of the switches, the inverter operates in different operating modes, as shown in FIGS. 3A-10C.

Figure 3A:
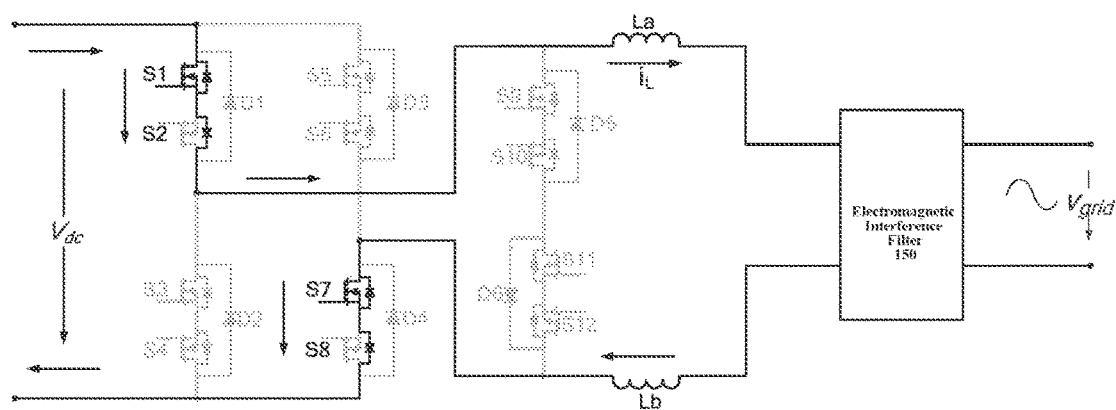
FIGS. 3A-3C are schematic diagrams of the inverter of FIG. 1 in a first operating mode.

Referring to FIG. 3A, in a first operating mode, the first MOSFET switch S1 and the seventh MOSFET switch S7 may be turned on firstly, at this time, current flows through the first MOSFET switch S1, the seventh MOSFET switch S7, a body diode of the second MOSFET switch S2, a body diode of the eighth MOSFET switch S8, the first inductor La and the second inductor Lb.

Figure 3B:
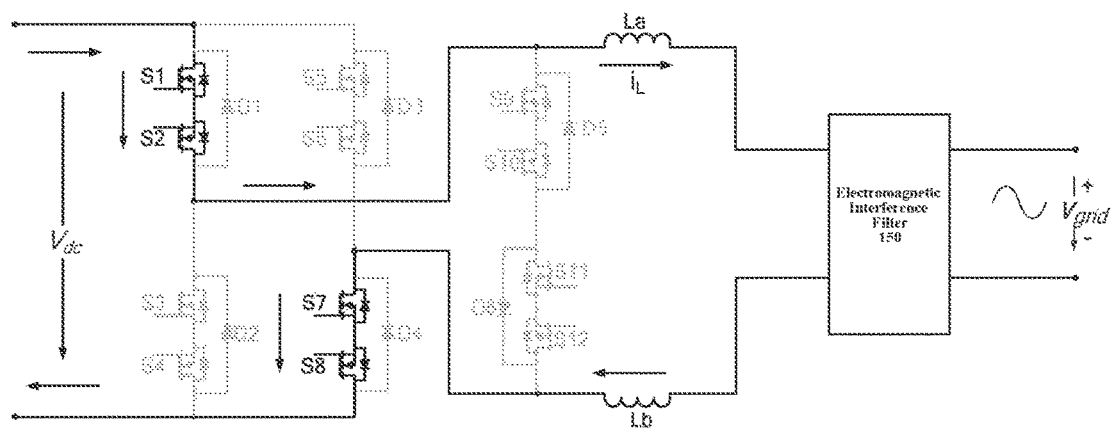

Referring to FIG. 3B, after the first MOSFET switch S1, the second MOSFET switch S2, the seventh MOSFET switch S7, and the eighth MOSFET switch S8 are all turned on, the current flows through the first MOSFET switch S1, the second MOSFET switch S2, the seventh MOSFET switch S7, the eighth MOSFET switch S8, the first inductor La and the second inductor Lb. The second MOSFET switch S2 and the eighth MOSFET switch S8 form naturally current commutation with their body diodes and are naturally soft turn-on.

Figure 3C:
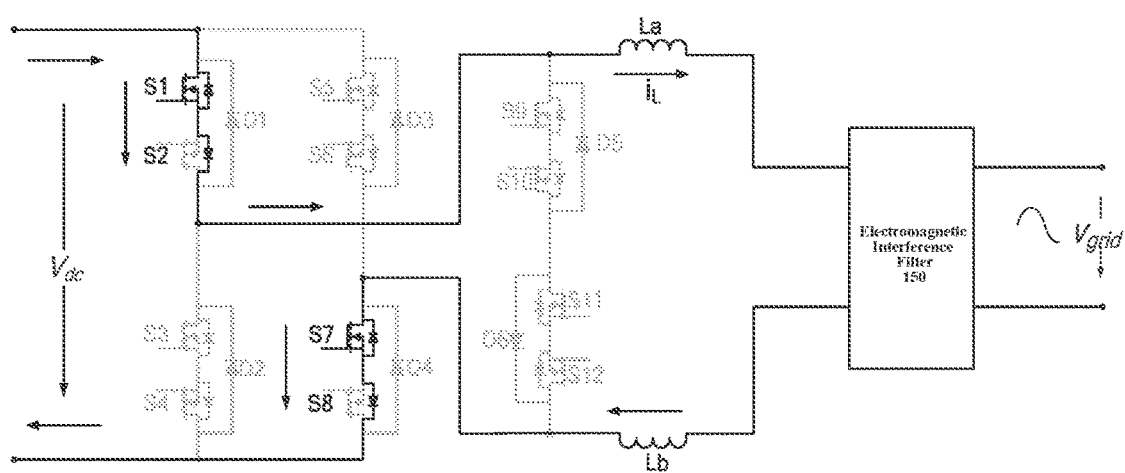

Referring to FIG. 3C, the second MOSFET switch S2 and the eighth MOSFET switch S8 are turned off earlier than the first MOSFET switch S1 and the seventh MOSFET switch S7 and are naturally soft turn-off.

Figure 4A:
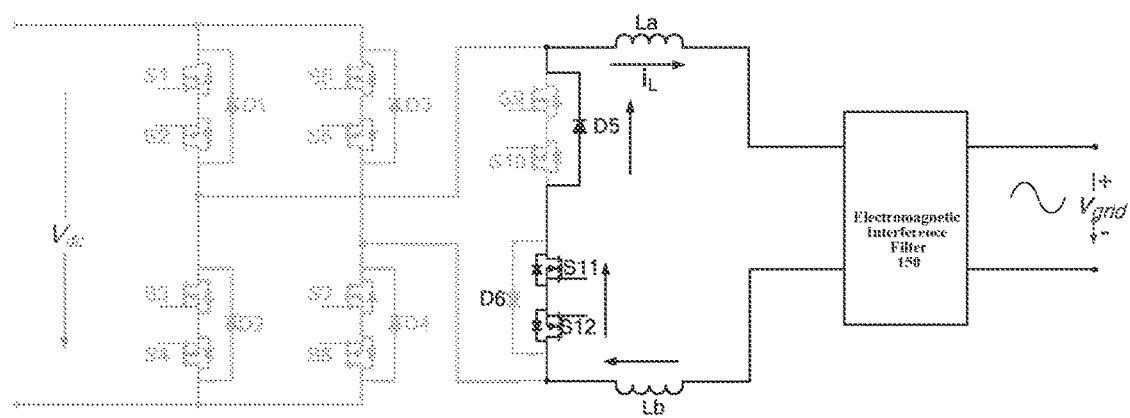
FIGS. 4A-4C are schematic diagrams of the inverter of FIG. 1 in a second operating mode.

Referring to FIG. 4A, in a second operating mode, all the MOSFET switches of the first bridge leg 110 and the second bridge leg 120 are in the off states. Since the ninth MOSFET switch S9 and the tenth MOSFET switch S10 have not been turned on at this time, the current $i_L$ is flowed through the first inductor La, the second inductor Lb, the eleventh MOSFET switch S11, the twelfth MOSFET switch S12 and the fifth diode D5, to form a first follow current path.

Figure 4B:
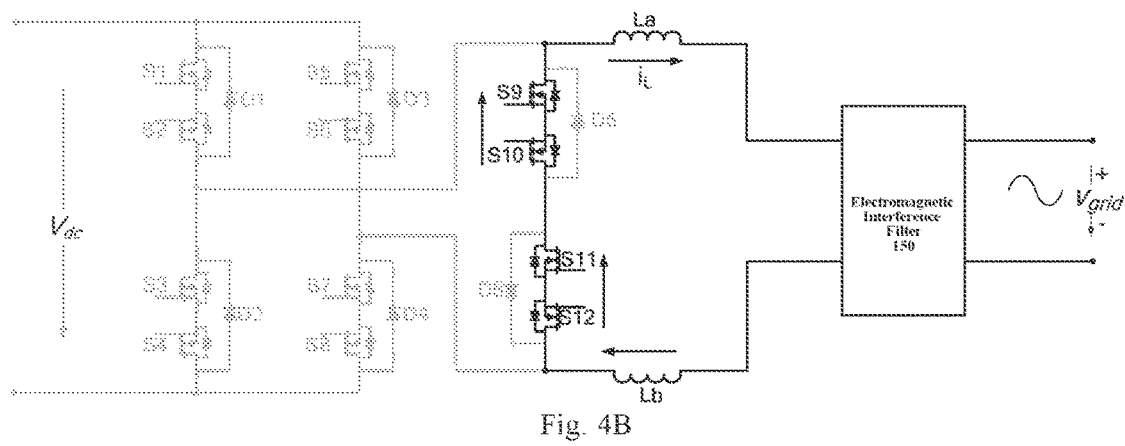

Referring to FIG. 4B, the ninth MOSFET switch S9 is turned on firstly, and then the tenth MOSFET switch S10 is turned on, at this time, the current $i_L$ flows through the ninth MOSFET switch S9, the tenth MOSFET switch S10, the eleventh MOSFET switch S11, the twelfth MOSFET switch S12, the first inductor La and the second inductor Lb. The ninth MOSFET switch S9, the tenth MOSFET switch S10 and the fifth diode D5 form naturally current commutation with their body diodes and are naturally soft turn-on.

Figure 4C:
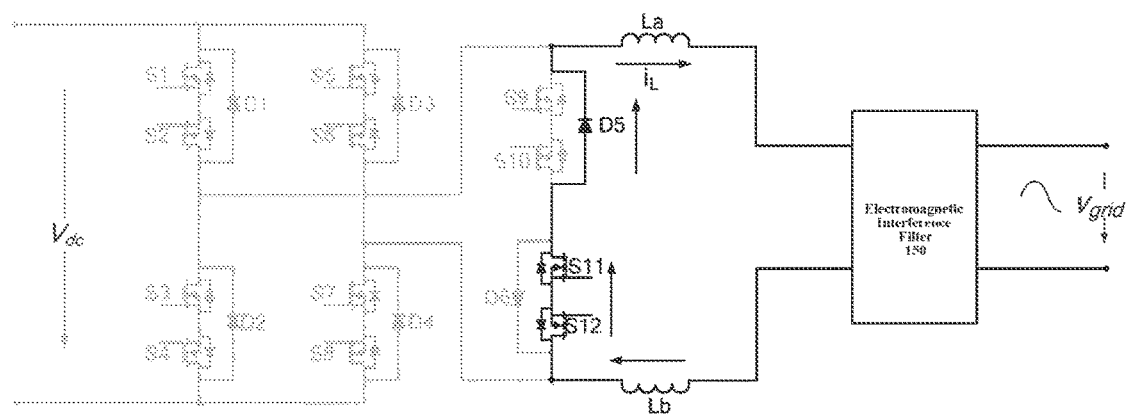

Referring to FIG. 4C, the tenth MOSFET switch S10 is turned off firstly, and then the ninth MOSFET switch S9 is turned off. The current $i_L$ is continued through the fifth diode D5, the eleventh MOSFET switch S11 and the twelfth MOSFET switch S12. The ninth MOSFET switch S9, the tenth MOSFET switch S10 and the fifth diode D5 form naturally current commutation with their body diodes and are naturally soft turn-off.

Figure 5A:
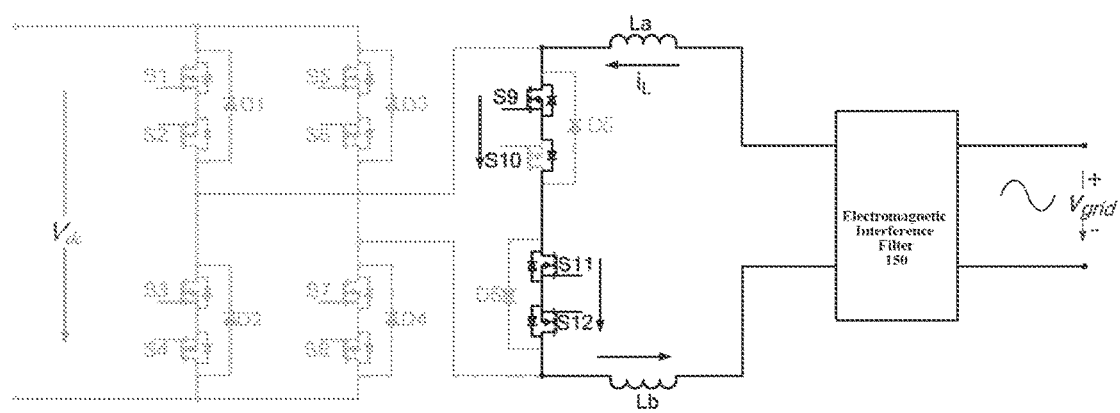
FIGS. 5A-5C are schematic diagrams of the inverter of FIG. 1 in a third operating mode.

Referring to FIG. 5A, in a third operating mode, the ninth MOSFET switch S9 may be turned on firstly. The current $i_L$ flows through the ninth MOSFET switch S9, a body diode of the tenth MOSFET switch S10, the eleventh MOSFET switch S11 and the twelfth MOSFET switch S12.

Figure 5B:
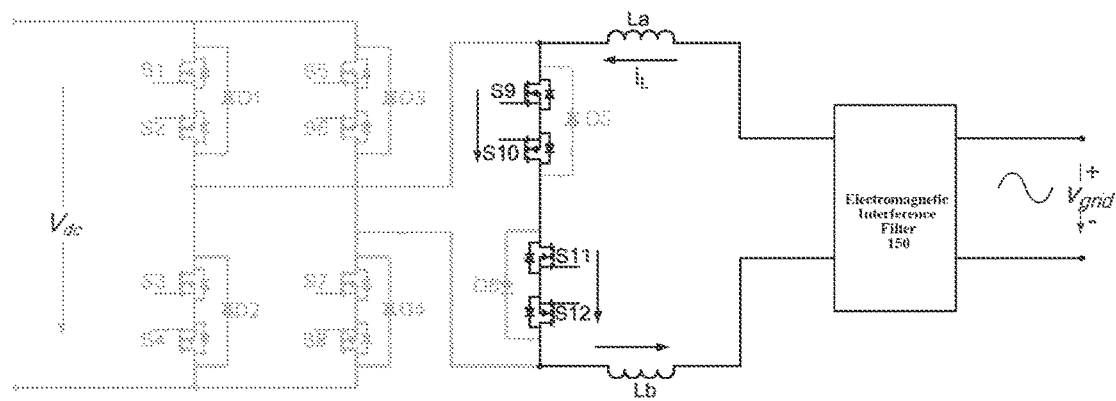

Referring to FIG. 5B, the tenth MOSFET switch S10 is turned on at this time, and the tenth MOSFET switch S10 forms naturally current commutation with its body diode and is naturally soft turn-on. The current $i_L$ flows through the ninth MOSFET switch S9, the tenth MOSFET switch S10, the eleventh MOSFET switch S11 and the twelfth MOSFET switch S12.

Figure 5C:
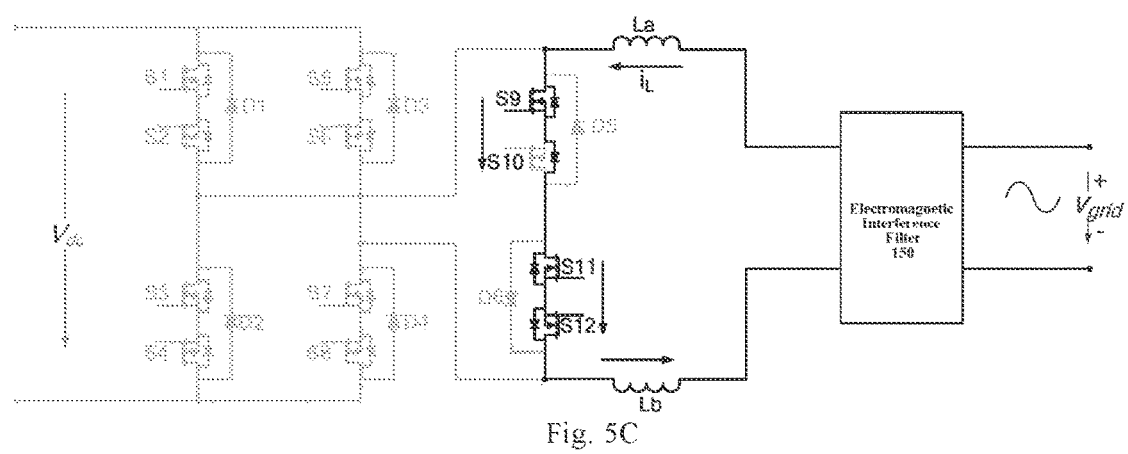

Referring to FIG. 5C, when the tenth MOSFET switch S10 is turned off, and the tenth MOSFET switch S10 forms naturally current commutation with its body diode and is naturally soil turn-off.

Figure 6A:
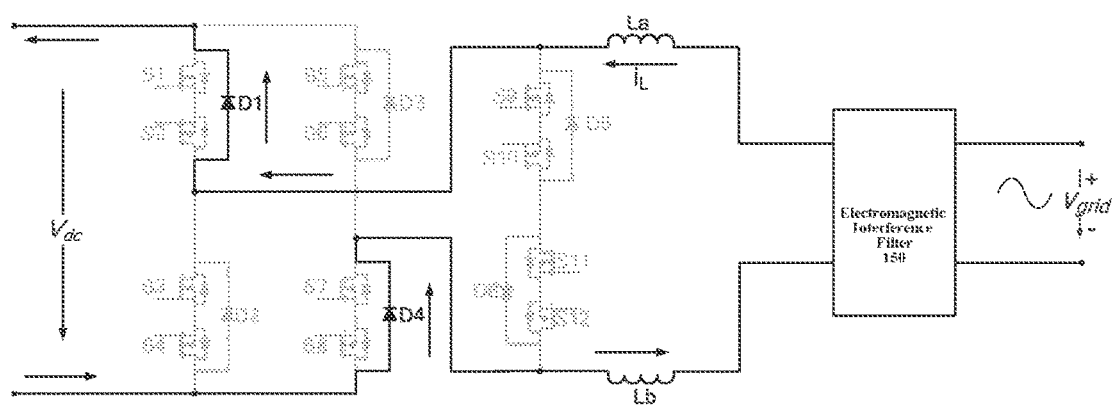
FIGS. 6A-6C are schematic diagrams of the inverter of FIG. 1 in a fourth operating mode.

Referring to FIG. 6A, in a fourth operating mode, the ninth MOSFET switch S9 is turned off at this time. The current $i_L$ of the first inductor La and the second inductor Lb is continued through the first diode D1 and the fourth diode D4. The first inductor La, the second inductor Lb, the first diode D1 and the fourth diode D4 form a second follow current path.

Figure 6B:
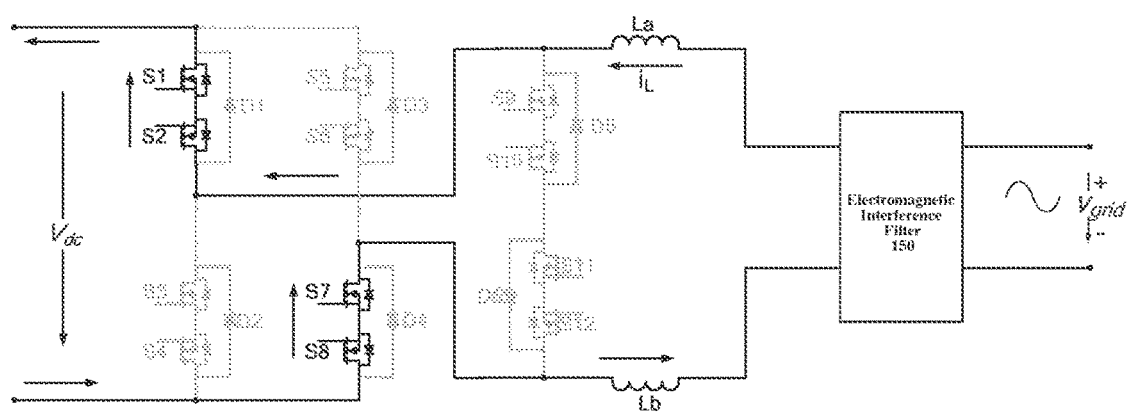

Referring to FIG. 6B, the first MOSFET switch S1 and the seventh MOSFET switch S7 are turned on firstly, and then the second MOSFET switch S2 and the eighth MOSFET switch S8 are turned on. The current $i_L$ flows through the first MOSFET switch S1, the second MOSFET switch S2, the seventh MOSFET S7, the eighth MOSFET switch S8, the first inductor La and the second inductor Lb. The first MOSFET switch S1, the second MOSFET switch S2 and the first diode D1 form naturally current commutating with their body diodes, and the seventh MOSFET S7, the eighth MOSFET switch S8 and the fourth diode D4 form naturally current commutation with their body diodes and are naturally soft turn-on.

Figure 6C:
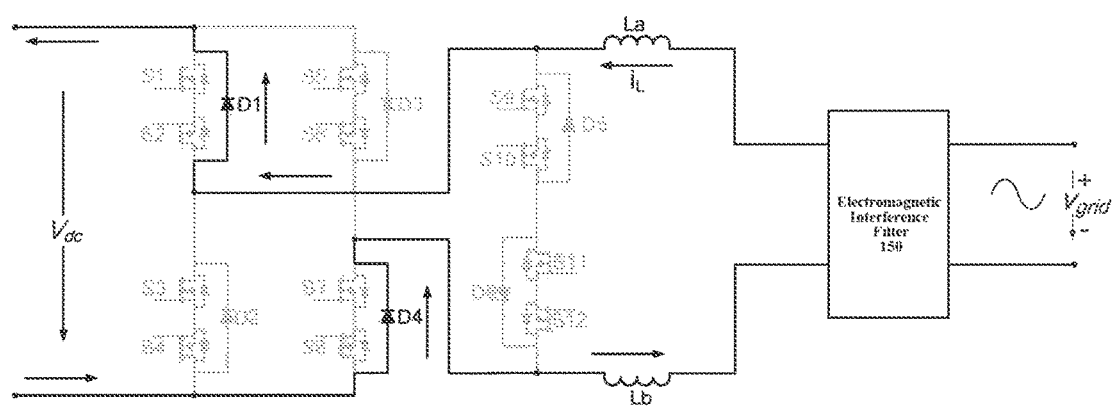

Referring to FIG. 6C, the second MOSFET switch S2 and the eighth MOSFET switch S8 may be turned off firstly, and then the first MOSFET switch S1 and the seventh MOSFET S7 may be turned off, the above switches and the corresponding first diode D1 and fourth diode D4 and form naturally current commutation with their body diodes and are soft turn-off.

Figure 7A:
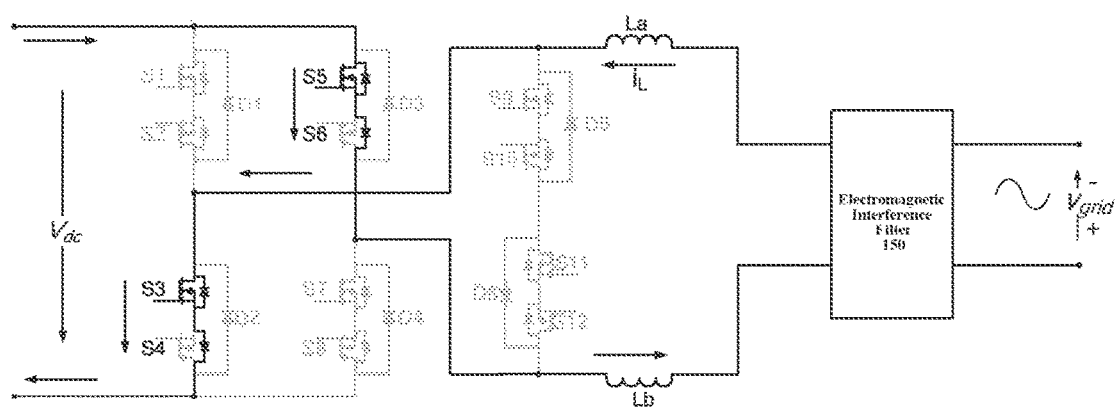
FIGS. 7A-7C are schematic diagrams of the inverter of FIG. 1 in a fifth operating mode.
Figure 7B:
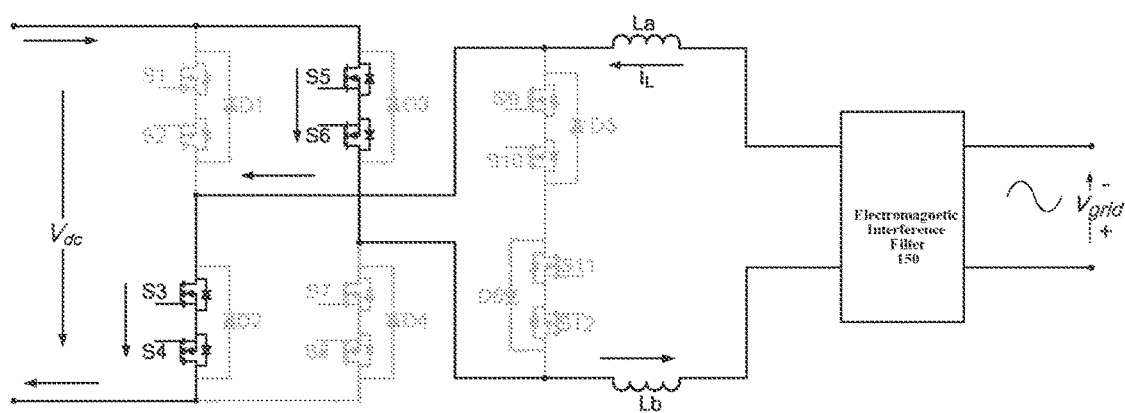
Figure 7C:
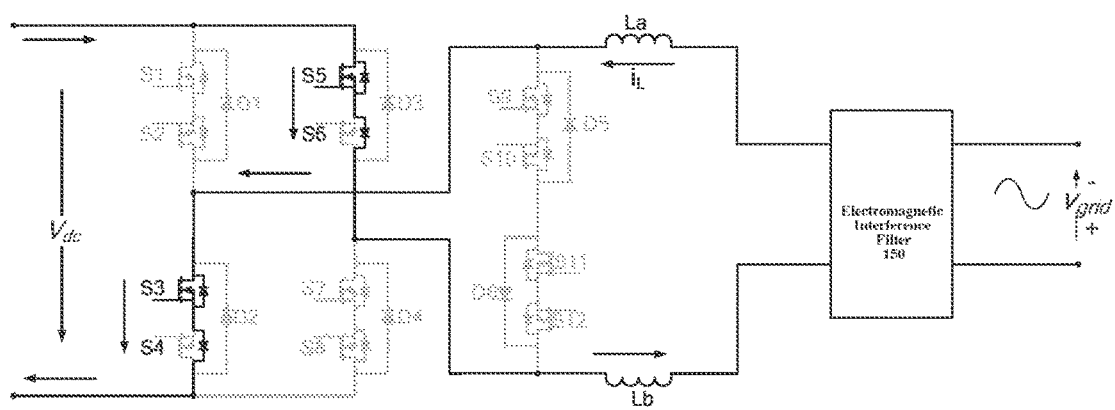

As shown in FIGS. 7A-7C, in a fifth operating mode, respective switch actions may refer to switch actions as shown in FIGS. 3A-3B, which will not be repeatedly illustrated herein.

Figure 8A:
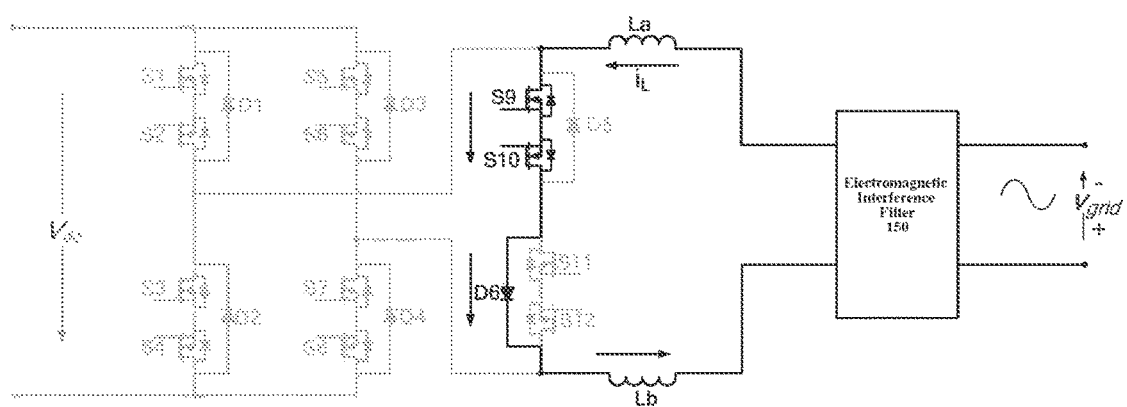
FIGS. 8A-8C are schematic diagrams of the inverter of FIG. 1 in a sixth operating mode.
Figure 8B:
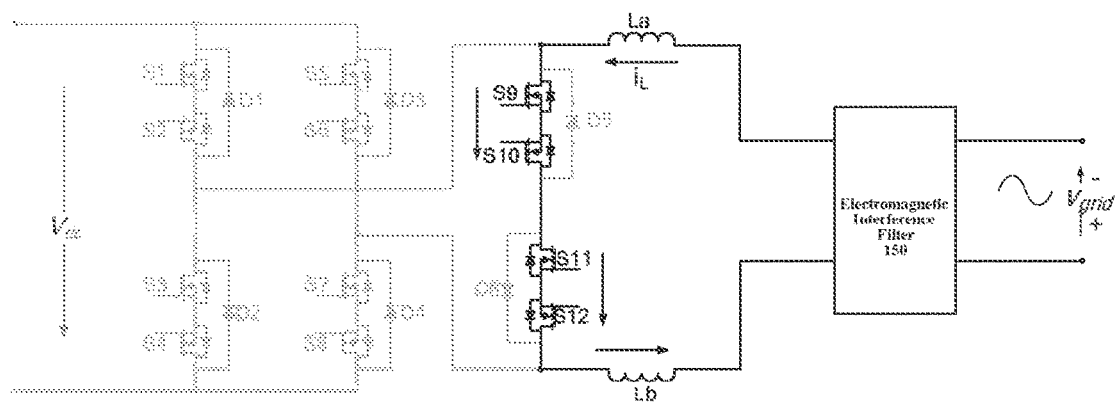
Figure 8C:
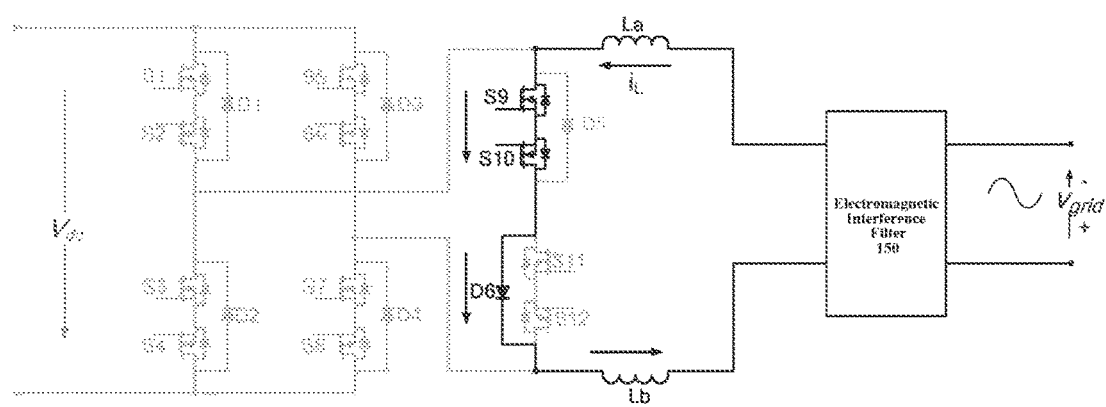

Referring to FIGS. 8A-8C, in a sixth operating mode, after the third MOSFET switch S3, the fourth MOSFET switch S4, the fifth MOSFET switch S5 and the sixth MOSFET switch S6 are turned off and before the eleventh MOSFET switch S11 and the twelfth MOSFET switch S12 are turned on, the first inductor La, the second inductor Lb, the ninth MOSFET switch S9, the tenth MOSFET switch S10 and the sixth diode D6 form a third follow current path. Respective switch actions may refer to switch actions as shown FIGS. 4A-4C, which will not be repeatedly illustrated herein.

Figure 9A:
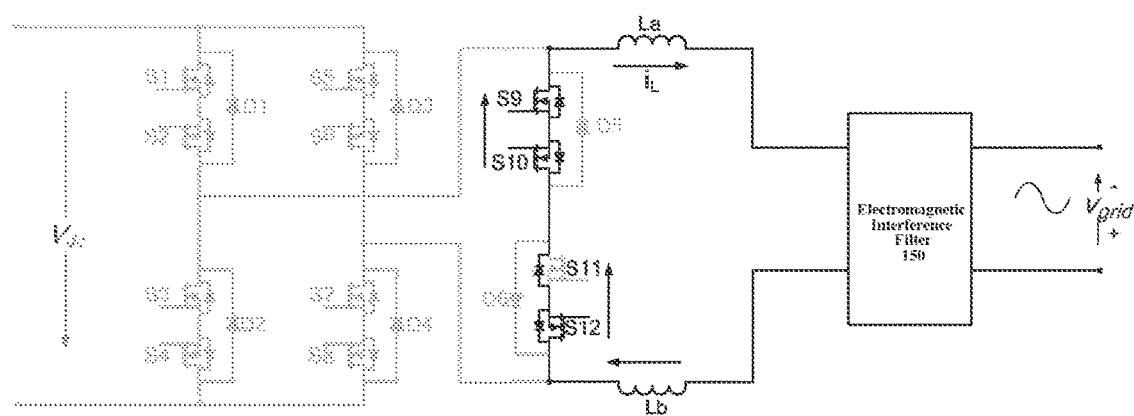
FIGS. 9A-9C are schematic diagrams of the inverter of FIG. 1 in a seventh operating mode.
Figure 9B:
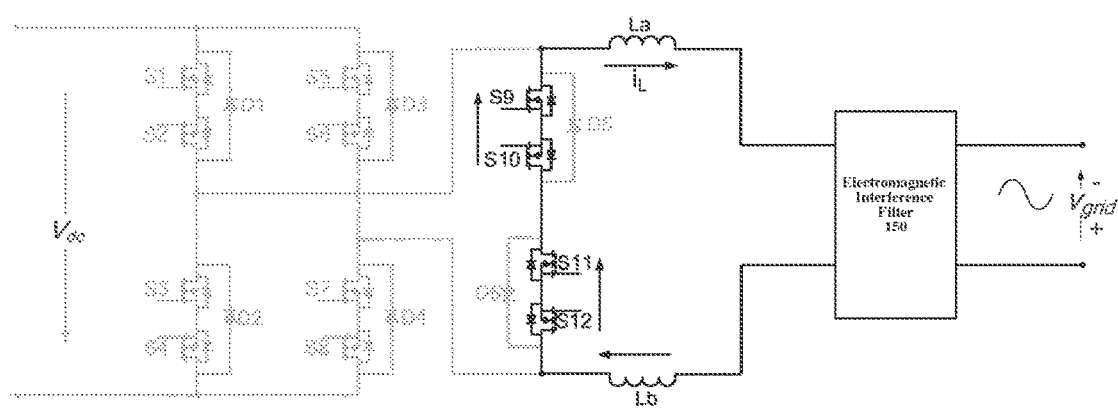
Figure 9C:
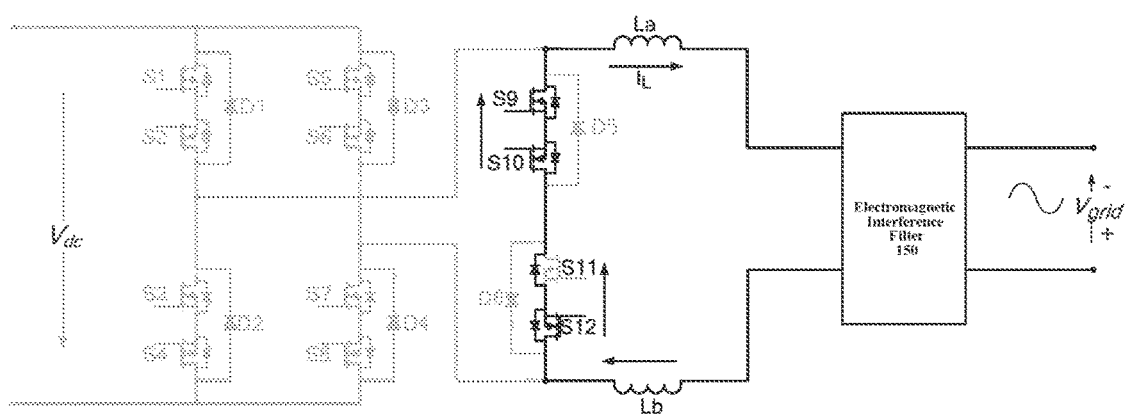

As shown in FIGS. 9A-9C, in a seventh operating mode, respective switch actions may refer to switch actions as shown in FIGS. 5A-5B, which will not be repeatedly illustrated herein.

Figure 10A:
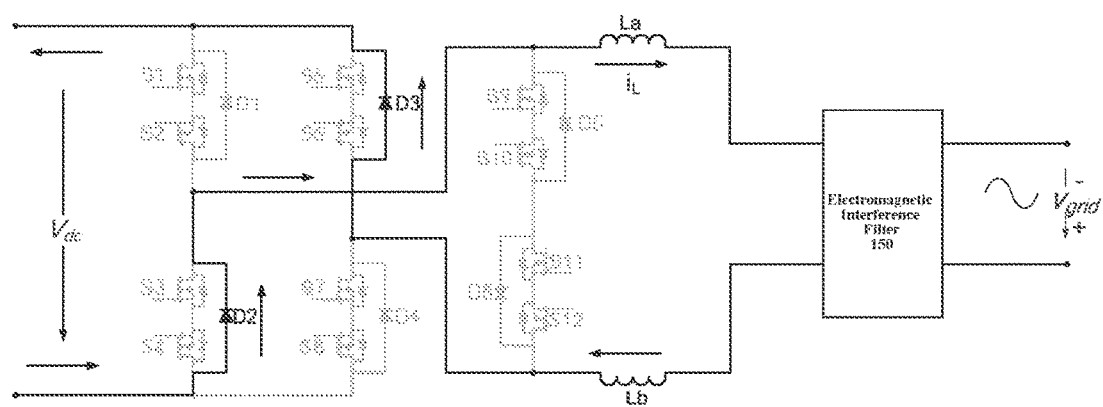
FIGS. 10A-10C are schematic diagrams of the inverter of FIG. 1 in an eighth operating mode.
Figure 10B:
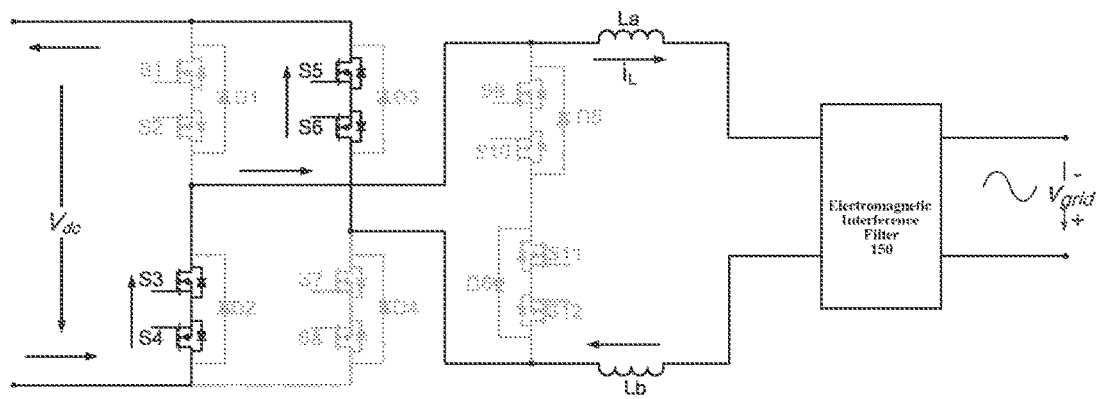
Figure 10C:
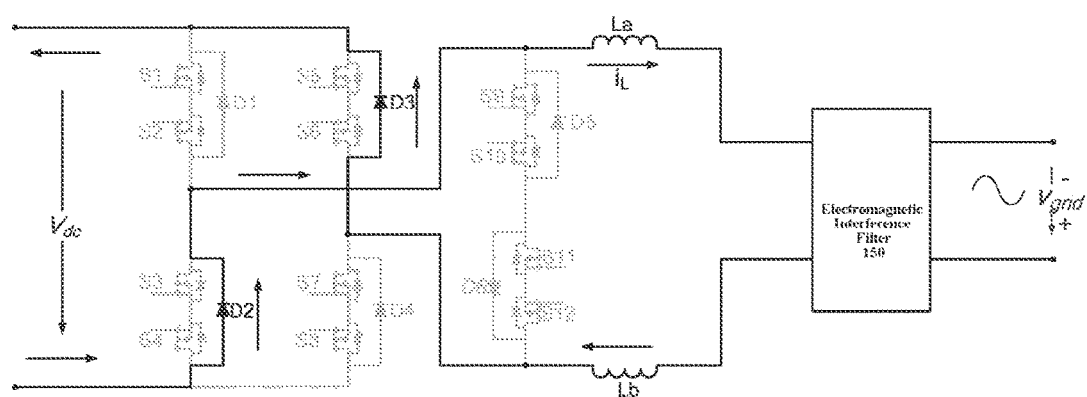

Referring to FIGS. 10A-10C, in an eighth operating mode, after the eleventh MOSFET switch S11 and the twelfth MOSFET switch S12 are turned off, and before the third MOSFET switch S3, the fourth MOSFET switch S4, the fifth MOSFET switch S5 and the sixth MOSFET switch S6 are turned on, the current $i_L$ of the first inductor La and the second inductor Lb is continued through the second diode D2 and the third diode D3. The first inductor La, the second inductor Lb, the second diode D2 and the third diode D3 form a fourth follow current path. Respective switch actions may refer to switch actions as shown in FIGS. 6A-6C, which will not be repeatedly illustrated herein.

To sum up, with the circuit design, the inverter of the present disclosure builds a full MOSFET inverter bridge. By adding a third bridge leg, follow current path of the inductor current is improved, so that the inverter bridge has both reactive and active transmission capacity. Further, through additionally adding diodes, soft switch actions of most switching transistors may be achieved, which effectively reduces switching losses when MOSFETs are applied.

Other embodiments of the disclosure may be apparent to those who are skilled in the art from consideration of the specification and practice of the disclosure disclosed herein. This application is intended to cover any variations, uses, or adoptions of the disclosure following the general principles thereof and including such departures from the present disclosure as conic within known or customary practice in the art. It is intended that the specification and examples should be considered as exemplary only with a true scope and spirit of the disclosure which is being indicated by the following claims.

What is claimed is:
1. An inverter, comprising:
a first bridge leg, electrically coupled to a first input node of the inverter and a second input node of the inverter, and comprising a first MOSFET switch, a second MOSFET switch, a third MOSFET switch and a fourth MOSFET switch in sequence, a connection point between the second MOSFET switch and the third MOSFET switch being served as a first node;
a second bridge leg, connected in parallel with the first bridge leg, and comprising a fifth MOSFET switch, a sixth MOSFET switch, a seventh MOSFET switch and an eighth MOSFET switch in sequence, a connection point between the sixth MOSFET switch and the seventh MOSFET switch being served as a second node;
a third bridge leg, electrically coupled between the first node and the second node, and comprising a ninth MOSFET switch, a tenth MOSFET switch, an eleventh MOSFET switch and a twelfth MOSFET switch in sequence;
a first diode, connected in parallel with the first MOSFET switch and the second MOSFET switch, wherein the first MOSFET switch and the second MOSFET switch are in anti-series connection;
a second diode, connected in parallel with the third MOSFET switch and the fourth MOSFET switch, wherein the third MOSFET switch and the fourth MOSFET switch are in anti-series connection;
a third diode, connected in parallel with the fifth MOSFET switch and the sixth MOSFET switch, wherein the fifth MOSFET switch and the sixth MOSFET switch are in anti-series connection;
a fourth diode, connected in parallel with the seventh MOSFET switch and the eighth MOSFET switch, wherein the seventh MOSFET switch and the eighth MOSFET switch are in anti-series connection;
a fifth diode, connected in parallel with the ninth MOSFET switch and the tenth MOSFET switch, wherein the ninth MOSFET switch and the tenth MOSFET switch are in anti-series connection;
a sixth diode, connected in parallel with the eleventh MOSFET switch and the twelfth MOSFET switch, wherein the eleventh MOSFET switch and the twelfth MOSFET switch are in anti-series connection, and are in anti-series connection with the fifth diode;
a first inductor, electrically coupled between the first node and a first output end of the inverter; and
a second inductor, electrically coupled between the second node and a second output end of the inverter,
wherein the first MOSFET switch, the third MOSFET switch, the fifth MOSFET switch, the seventh MOSFET switch, the ninth MOSFET switch and the twelfth MOSFET switch are high-voltage MOSFETs, and the second MOSFET switch, the fourth MOSFET switch, the sixth MOSFET switch, the eighth MOSFET switch, the tenth MOSFET switch and the eleventh MOSFET switch are low-voltage MOSFETs, and
wherein the inverter is configured to perform;
turning on and off the first MOSFET switch, the second MOSFET switch, the seventh MOSFET switch and the eighth MOSFET switch synchronously, and controlling on and off of the ninth MOSFET switch and the tenth MOSFET switch to be complementary with on and off of the first MOSFET switch, the second MOSFET switch, the seventh MOSFET switch and the eighth MOSFET switch;

turning on and off the third MOSFET switch, the fourth MOSFET switch, the fifth MOSFET switch and the sixth MOSFET switch synchronously, and controlling turning on and off of the eleventh MOSFET switch and the twelfth MOSFET switch to be complementary with on and off of the third MOSFET switch, the fourth MOSFET switch, the fifth MOSFET switch and the sixth MOSFET switch;

when the first MOSFET switch, the second MOSFET switch, the seventh MOSFET switch and the eighth MOSFET switch are controlled to be turned on, turning on the first MOSFET switch and the seventh MOSFET switch earlier than the second MOSFET switch and the eighth MOSFET switch, and when the first MOSFET switch, the second MOSFET switch, the seventh MOSFET switch and the eighth MOSFET switch are controlled to be turned off, turning off the first MOSFET switch and the seventh MOSFET switch later than the second MOSFET switch and the eighth MOSFET switch; and when the third MOSFET switch, the fourth MOSFET switch, the fifth MOSFET switch and the sixth MOSFET switch are controlled to be turned on, turning on the third MOSFET switch and the fifth MOSFET switch earlier than the fourth MOSFET switch and the sixth MOSFET switch, and when the third MOSFET switch, the fourth MOSFET switch, the fifth MOSFET switch and the sixth MOSFET switch are controlled to be turned off, turning off the third MOSFET switch and the fifth MOSFET switch later than the fourth MOSFET switch and the sixth MOSFET switch.

2. The inverter according to claim 1, further comprising: an electromagnetic interference filter, coupled between the first and second inductors and the first and second output ends of the inverter.

3. The inverter according to claim 1, further comprising: a controller, configured to generate control signals to control on and off of the first MOSFET switch to the twelfth MOSFET switch.

4. The inverter according to claim 1, wherein the first input node of the inverter and the second input node of the inverter are electrically coupled to a photovoltaic array.

5. The inverter according to claim 1, wherein in an operating mode, the eleventh MOSFET switch, the twelfth MOSFET switch, the fifth diode, the first inductor and the second inductor form a first follow current path.

6. The inverter according to claim 1, wherein in an operating mode, the first diode, the fourth diode, the first inductor and the second inductor form a second follow current path.

7. The inverter according to claim 1, wherein in an operating mode, the ninth MOSFET switch, the tenth MOSFET switch, the sixth diode, the first inductor and the second inductor form a third follow current path.

8. The inverter according to claim 1, wherein in an operating mode, the second diode, the third diode, the first inductor and the second inductor form a fourth follow current path.

9. A control method for controlling an inverter comprising:

a first bridge leg, electrically coupled to a first input node of the inverter and a second input node of the inverter, and comprising a first MOSFET switch, a second MOSFET switch, a third MOSFET switch and a fourth MOSFET switch in sequence, a connection point between the second MOSFET switch and the third MOSFET switch being served as a first node;

a second bridge leg, connected in parallel with the first bridge leg, and comprising a fifth MOSFET switch, a sixth MOSFET switch, a seventh MOSFET switch and an eighth MOSFET switch in sequence, a connection point between the sixth MOSFET switch and the seventh MOSFET switch being served as a second node;

a third bridge leg, electrically coupled between the first node and the second node, and comprising a ninth MOSFET switch, a tenth MOSFET switch, an eleventh MOSFET switch and a twelfth MOSFET switch in sequence;

a first diode, connected in parallel with the first MOSFET switch and the second MOSFET switch, wherein the first MOSFET switch and the second MOSFET switch are in anti-series connection;

a second diode, connected in parallel with the third MOSFET switch and the fourth MOSFET switch, wherein the third MOSFET switch and the fourth MOSFET switch are in anti-series connection;

a third diode, connected in parallel with the fifth MOSFET switch and the sixth MOSFET switch, wherein the fifth MOSFET switch and the sixth MOSFET switch are in anti-series connection;

a fourth diode, connected in parallel with the seventh MOSFET switch and the eighth MOSFET switch, wherein the seventh MOSFET switch and the eighth MOSFET switch are in anti-series connection;

a fifth diode, connected in parallel with the ninth MOSFET switch and the tenth MOSFET switch, wherein the ninth MOSFET switch and the tenth MOSFET switch are in anti-series connection;

a sixth diode, connected in parallel with the eleventh MOSFET switch and the twelfth MOSFET switch, wherein the eleventh MOSFET switch and the twelfth MOSFET switch are in anti-series connection, and are in anti-series connection with the fifth diode;

a first inductor, electrically coupled between the first node and a first output end of the inverter; and a second inductor, electrically coupled between the second node and a second output end of the inverter, the method comprising:

turning on and off the first MOSFET switch, the second MOSFET switch, the seventh MOSFET switch and the eighth MOSFET switch synchronously, and controlling on and off of the ninth MOSFET switch and the tenth MOSFET switch to be complementary with on and off of the first MOSFET switch, the second MOSFET switch, the seventh MOSFET switch and the eighth MOSFET switch; and turning on and off the third MOSFET switch, the fourth MOSFET switch, the fifth MOSFET switch and the sixth MOSFET switch synchronously, and controlling turning on and off of the eleventh MOSFET switch and the twelfth MOSFET switch to be complementary with on and off of the third MOSFET switch, the fourth MOSFET switch, the fifth MOSFET switch and the sixth MOSFET switch, wherein the control method further comprises:

when the first MOSFET switch, the second MOSFET switch, the seventh MOSFET switch and the eighth MOSFET switch are controlled to be turned on, turning on the first MOSFET switch and the seventh MOSFET switch earlier than the second MOSFET switch and the eighth MOSFET switch, and when the first MOSFET switch, the second MOSFET switch, the seventh MOSFET switch and the eighth MOSFET switch are controlled to be turned off, turning off the first MOSFET switch and the seventh MOSFET switch later than the second MOSFET switch and the eighth MOSFET switch; and when the third MOSFET switch, the fourth MOSFET switch, the fifth MOSFET switch and the sixth MOSFET switch are controlled to be turned on, turning on the third MOSFET switch and the fifth MOSFET switch earlier than the fourth MOSFET switch and the sixth MOSFET switch, and when the third MOSFET switch, the fourth MOSFET switch, the fifth MOSFET switch and the sixth MOSFET switch are controlled to be turned off, turning off the third MOSFET switch and the fifth MOSFET switch later than the fourth MOSFET switch and the sixth MOSFET switch.

10. The control method according to claim 9, further comprising:

during a half cycle when output voltage of the inverter is positive, keeping the eleventh MOSFET switch and the twelfth MOSFET switch to be turned on; and during a half cycle when output voltage of the inverter is negative, keeping the ninth MOSFET switch and the tenth MOSFET switch to be turned on.

11. The control method according to claim 9, further comprising forming a first follow current path with the eleventh MOSFET switch, the twelfth MOSFET switch, the fifth diode, the first inductor and the second inductor in an operating mode.

12. The control method according to claim 9, further comprising forming a second follow current path with the first diode, the fourth diode, the first inductor and the second inductor in an operating mode.

13. The control method according to claim 9, further comprising forming a third follow current path with the ninth MOSFET switch, the tenth MOSFET switch, the sixth diode, the first inductor and the second inductor in an operating mode.

14. The control method according to claim 9, further comprising forming a fourth follow current path with the second diode, the third diode, the first inductor and the second inductor form in an operating mode.

15. The control method according to claim 9, wherein the first MOSFET switch, the third MOSFET switch, the fifth MOSFET switch, the seventh MOSFET switch, the ninth MOSFET switch and the twelfth MOSFET switch are high-voltage MOSFETs, and the second MOSFET switch, the fourth MOSFET switch, the sixth MOSFET switch, the eighth MOSFET switch, the tenth MOSFET switch and the eleventh MOSFET switch are low-voltage MOSFETs.

* * * * *